United States Patent
Watson

(10) Patent No.: US 6,775,406 B1
(45) Date of Patent: Aug. 10, 2004

(54) COLORIZING A BLACK-AND-WHITE IMAGE TO FACILITATE THE IDENTIFICATION OF A PATTERN IN THE IMAGE

(76) Inventor: Douglas L. Watson, 777 E. Brokaw Rd., San Jose, CA (US) 95112

( * ) Notice: Subject to any disclaimer, the term of this patent is extended or adjusted under 35 U.S.C. 154(b) by 0 days.

(21) Appl. No.: 10/280,770

(22) Filed: Oct. 25, 2002

Related U.S. Application Data

(63) Continuation-in-part of application No. 09/383,025, filed on Aug. 25, 1999, now abandoned.
(60) Provisional application No. 60/097,817, filed on Aug. 25, 1998.

(51) Int. Cl.[7] ............................................. G06K 9/00
(52) U.S. Cl. ..................... 382/162; 382/165; 348/29; 348/34
(58) Field of Search .................. 382/128, 162, 382/165, 169, 181, 224; 345/589, 591, 593; 348/29, 34, 453

(56) References Cited

U.S. PATENT DOCUMENTS

| | | | |
|---|---|---|---|
| 4,984,072 A | * 1/1991 | Sandrew | 348/34 |
| 5,042,077 A | * 8/1991 | Burke | 382/169 |
| 5,093,717 A | * 3/1992 | Sandrew | 348/34 |
| 5,155,589 A | 10/1992 | Gere | 348/29 |
| 5,252,953 A | * 10/1993 | Sandrew et al. | 345/473 |
| 5,534,915 A | * 7/1996 | Sandrew | 348/29 |
| 5,743,266 A | * 4/1998 | Levene et al. | 600/458 |
| 5,793,883 A | * 8/1998 | Kim et al. | 382/128 |
| 5,914,723 A | * 6/1999 | Gajewska | 345/597 |

* cited by examiner

*Primary Examiner*—Daniel Mariam

(57) ABSTRACT

The invention facilitates the identification of a pattern in an image by displaying a multiplicity of versions of the image in sequence at a specified rate. The display of each version of the image includes only pixels having a specified grayscale value or a grayscale value in a specified range of grayscale values that is smaller than the range of grayscale values for all pixels of the image. Each pixel displayed in a version of the image is displayed in the color corresponding to the grayscale value of that pixel. The specified grayscale value or range of grayscale values for which pixels are displayed in each successive displayed version of the image is incremented or decremented from the specified grayscale value or range of grayscale values for which pixels are displayed in the immediately previous displayed version of the image by a specified grayscale value increment or decrement.

42 Claims, 44 Drawing Sheets

(41 of 44 Drawing Sheet(s) Filed in Color)

(prior art)

Figure 1

|     |     |     |     | 558 | 558 | 559 | 560 | 561 | 563 |
| --- | --- | --- | --- | --- | --- | --- | --- | --- | --- |
|     |     | 558 | 559 |     | 558 | 559 | 561 | 563 | 564 |
|     |     |     | 558 |     |     | 558 | 561 | 563 |     |
|     | 558 | 558 | 559 | 558 |     |     |     | 558 | 560 |
| 558 | 559 | 560 | 561 | 560 | 559 | 558 |     | 558 | 559 |
| 560 | 562 | 561 | 562 | 561 | 560 | 560 | 561 | 558 | 558 |
| 559 | 561 | 563 | 564 | 563 | 562 | 562 | 561 | 559 |     |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 3a

| 555 | | | | | | 559 | 560 | 561 | 563 |
|---|---|---|---|---|---|---|---|---|---|
| | | | 559 | | | 559 | 561 | 563 | 564 |
| | | | | | | | | 561 | 563 |
| | | | 559 | | | | | | 560 |
| | 559 | 560 | 561 | 560 | 559 | 558 | | | 559 |
| 560 | 562 | 561 | 562 | 561 | 560 | 560 | 561 | | |
| 559 | 561 | 563 | 564 | 563 | 562 | 562 | 561 | 559 | |
| | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 3b

| 555 | 556 | 556 | | | | 560 | 561 | 563 |
|---|---|---|---|---|---|---|---|---|
| 556 | 556 | | | | | 561 | 563 | 564 |
| | | | | | | | 561 | 563 |
| | | | | | 556 | | | 560 |
| | | 560 | 561 | 560 | | | | |
| 560 | 562 | 561 | 562 | 561 | 560 | 560 | 561 | | |
| | 561 | 563 | 564 | 563 | 562 | 562 | 561 | | |
| | 560 | | 560 | | 563 | 564 | 563 | 561 | 560 |
| | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 3c

| 555 | 556 | 556 | 557 | | | | | 561 | 563 |
|---|---|---|---|---|---|---|---|---|---|
| 556 | 556 | | | 557 | | | 561 | 563 | 564 |
| 557 | 557 | 557 | | 557 | 557 | 557 | | 561 | 563 |
| 557 | | | | | 557 | 556 | 557 | | |
| | | | 561 | | | | 557 | | |
| | 562 | 561 | 562 | 561 | | | 561 | | |
| | 561 | 563 | 564 | 563 | 562 | 562 | 561 | | 557 |
| | | | | | 563 | 564 | 563 | 561 | |
| | 561 | | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | | | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 3d

| 555 | 556 | 556 | 557 | 558 | 558 | | | | 563 |
|---|---|---|---|---|---|---|---|---|---|
| 556 | 556 | 558 | | 557 | 558 | | | 563 | 564 |
| 557 | 557 | 557 | 558 | 557 | 557 | 557 | 558 | | 563 |
| 557 | 558 | 558 | | 558 | 557 | 556 | 557 | 558 | |
| 558 | | | | | | 558 | 557 | 558 | |
| | 562 | | 562 | | | | 558 | 558 | |
| | | 563 | 564 | 563 | 562 | 562 | | | 557 |
| 558 | | | | 563 | 564 | 563 | | | |
| | | | | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | | | | 562 | 563 | 564 | 565 | 564 |
| 566 | 564 | 562 | | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 3e

| 555 | 556 | 556 | 557 | 558 | 558 | 559 |     |     | 563 |
|-----|-----|-----|-----|-----|-----|-----|-----|-----|-----|
| 556 | 556 | 558 | 559 | 557 | 558 | 559 |     | 563 | 564 |
| 557 | 557 | 557 | 558 | 557 | 557 | 557 | 558 |     | 563 |
| 557 | 558 | 558 | 559 | 558 | 557 | 556 | 557 | 558 |     |
| 558 | 559 |     |     |     | 559 | 558 | 557 | 558 | 559 |
|     |     |     |     |     |     |     |     | 558 | 558 |
| 559 |     | 563 | 564 | 563 |     |     |     | 559 | 557 |
| 558 |     | 559 |     | 559 | 563 | 564 | 563 |     |     |
| 559 |     |     |     |     | 564 | 566 | 565 | 564 | 565 |
| 563 | 565 |     |     | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 |     |
| 565 |     |     | 559 |     |     | 563 | 564 | 565 | 564 |
| 566 | 564 |     |     | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 3f

| 555 | 556 | 556 | 557 | 558 | 558 | 559 | 560 | | |
|---|---|---|---|---|---|---|---|---|---|
| 556 | 556 | 558 | 559 | 557 | 558 | 559 | | | 564 |
| 557 | 557 | 557 | 558 | 557 | 557 | 557 | 558 | | |
| 557 | 558 | 558 | 559 | 558 | 557 | 556 | 557 | 558 | 560 |
| 558 | 559 | 560 | | 560 | 559 | 558 | 557 | 558 | 559 |
| 560 | | | | | 560 | 560 | | 558 | 558 |
| 559 | | | 564 | | | | | 559 | 557 |
| 558 | 560 | 559 | 560 | 559 | | 564 | | | 560 |
| 559 | | 560 | | | 564 | 566 | 565 | 564 | 565 |
| | 565 | | | 566 | 565 | 565 | 566 | 565 | 566 |
| 564 | | 566 | 564 | 565 | 564 | | 564 | 566 | 565 |
| 566 | 565 | 564 | | 564 | | 564 | 565 | 564 | |
| 565 | | 560 | 559 | | | | 564 | 565 | 564 |
| 566 | 564 | | | | 564 | 565 | 566 | 565 | 564 |
| 565 | 566 | 564 | | 565 | 566 | 567 | 567 | 567 | 566 |
| 564 | 565 | 565 | 566 | 567 | 567 | 568 | 571 | 568 | 567 |

| 555 | 556 | 556 | 557 | 558 | 558 | 559 | 560 | 561 | |
|---|---|---|---|---|---|---|---|---|---|
| 556 | 556 | 558 | 559 | 557 | 558 | 559 | 561 | | |
| 557 | 557 | 557 | 558 | 557 | 557 | 557 | 558 | 561 | |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | | | | 562 | 562 | 561 | 559 | 557 |
| 558 | 560 | 559 | 560 | 559 | | | | 561 | 560 |
| 559 | 561 | 560 | 561 | 562 | | 566 | | | |
| | | 562 | 562 | 566 | | | 566 | | 566 |
| | | 566 | | | | | | 566 | |
| 566 | | | | | | | | | 562 |
| | 562 | 560 | 559 | 561 | 562 | | | | |
| 566 | | 562 | 561 | | | 566 | | |
| | 566 | | | | 566 | 567 | 567 | 567 | 566 |
| | | | 566 | 567 | 567 | 568 | 571 | 568 | 567 |

Figure 3i

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 |  |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 |  | 563 | 562 | 562 | 561 | 559 | 557 |
| 558 | 560 | 559 | 560 | 559 | 563 |  | 563 | 561 | 560 |
| 559 | 561 | 560 | 561 | 562 |  |  |  |  |  |
| 563 |  | 562 | 562 |  |  |  |  |  |  |
|  | 563 |  |  |  |  | 563 |  |  |  |
|  |  |  | 563 |  | 563 |  |  |  | 562 |
|  | 562 | 560 | 559 | 561 | 562 | 563 |  |  |  |
|  |  | 562 | 561 | 563 |  |  |  |  |  |
|  |  |  | 563 |  |  | 567 | 567 | 567 |  |
|  |  |  |  | 567 | 567 | 568 | 571 | 568 | 567 |

Figure 3j

| 555 | 556 | 556 | 557 | 558 | 558 | 559 | 560 | 561 | 563 |
|-----|-----|-----|-----|-----|-----|-----|-----|-----|-----|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 |  | 565 | 564 |  |
| 563 |  | 562 | 562 |  |  |  |  |  |  |
| 564 | 563 |  | 564 |  | 564 | 563 | 564 |  |  |
|  |  | 564 | 563 | 564 | 563 | 564 |  | 564 | 562 |
|  | 562 | 560 | 559 | 561 | 562 | 563 | 564 |  | 564 |
|  | 564 | 562 | 561 | 563 | 564 |  |  |  | 564 |
|  |  | 564 | 563 |  |  |  |  |  |  |
| 564 |  |  |  |  |  | 568 | 571 | 568 |  |

Figure 3k

| 555 | 556 | 556 | 557 | 558 | 558 | 559 | 560 | 561 | 563 |
|-----|-----|-----|-----|-----|-----|-----|-----|-----|-----|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 |     | 565 | 564 | 565 |
| 563 | 565 | 562 | 562 |     | 565 | 565 |     | 565 |     |
| 564 | 563 |     | 564 | 565 | 564 | 563 | 564 |     | 565 |
|     | 565 | 564 | 563 | 564 | 563 | 564 | 565 | 564 | 562 |
| 565 | 562 | 560 | 559 | 561 | 562 | 563 | 564 | 565 | 564 |
|     | 564 | 562 | 561 | 563 | 564 | 565 |     | 565 | 564 |
| 565 |     | 564 | 563 | 565 |     |     |     |     |     |
| 564 | 565 | 565 |     |     |     |     | 571 |     |     |

Figure 31

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 3m

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | ███ | 571 | ███ | 567 |

Figure 3n

| 555 | 556 | 556 | 557 | 558 | 558 | 559 | 560 | 561 | 563 |
|-----|-----|-----|-----|-----|-----|-----|-----|-----|-----|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 3o

| | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4a

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4b

| 555 | 556 | 556 |     | 558 | 558 | 559 | 560 | 561 | 563 |
|-----|-----|-----|-----|-----|-----|-----|-----|-----|-----|
| 556 | 556 | 558 | 559 |     | 558 | 559 | 561 | 563 | 564 |
|     |     |     | 558 |     |     |     | 558 | 561 | 563 |
|     | 558 | 558 | 559 | 558 |     | 556 |     | 558 | 560 |
| 558 | 559 | 560 | 561 | 560 | 559 | 558 |     | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4c

| 555 | 556 | 556 | 557 | ▓ | ▓ | 559 | 560 | 561 | 563 |
|---|---|---|---|---|---|---|---|---|---|
| 556 | 556 | ▓ | 559 | 557 | ▓ | 559 | 561 | 563 | 564 |
| 557 | 557 | 557 | ▓ | 557 | 557 | 557 | ▓ | 561 | 563 |
| 557 | ▓ | ▓ | 559 | ▓ | 557 | 556 | 557 | ▓ | 560 |
| ▓ | 559 | 560 | 561 | 560 | 559 | ▓ | 557 | ▓ | 559 |
| 560 | 562 | 561 | 562 | 561 | 560 | 560 | 561 | ▓ | ▓ |
| 559 | 561 | 563 | 564 | 563 | 562 | 562 | 561 | 559 | 557 |
| ▓ | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4d

| 555 | 556 | 556 | 557 | 558 | 558 |  | 560 | 561 | 563 |
|-----|-----|-----|-----|-----|-----|-----|-----|-----|-----|
| 556 | 556 | 558 |  | 557 | 558 |  | 561 | 563 | 564 |
| 557 | 557 | 557 | 558 | 557 | 557 | 557 | 558 | 561 | 563 |
| 557 | 558 | 558 |  | 558 | 557 | 556 | 557 | 558 | 560 |
| 558 |  | 560 | 561 | 560 |  | 558 | 557 | 558 |  |
| 560 | 562 | 561 | 562 | 561 | 560 | 560 | 561 | 558 | 558 |
|  | 561 | 563 | 564 | 563 | 562 | 562 | 561 |  | 557 |
| 558 | 560 |  | 560 |  | 563 | 564 | 563 | 561 | 560 |
|  | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4e

| 555 | 556 | 556 | 557 | 558 | 558 | 559 |  | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 |  |
| 558 | 559 |  | 561 |  | 559 | 558 | 557 | 558 | 559 |
|  | 562 | 561 | 562 | 561 |  |  | 561 | 558 | 558 |
| 559 | 561 | 563 | 564 | 563 | 562 | 562 | 561 | 559 | 557 |
| 558 |  | 559 |  | 559 | 563 | 564 | 563 | 561 |  |
| 559 | 561 |  | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 |  | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4f

| 555 | 556 | 556 | 557 | 558 | 558 | 559 | 560 | | 563 |
|---|---|---|---|---|---|---|---|---|---|
| 556 | 556 | 558 | 559 | 557 | 558 | 559 | | 563 | 564 |
| 557 | 557 | 557 | 558 | 557 | 557 | 557 | 558 | | 563 |
| 557 | 558 | 558 | 559 | 558 | 557 | 556 | 557 | 558 | 560 |
| 558 | 559 | 560 | | 560 | 559 | 558 | 557 | 558 | 559 |
| 560 | 562 | | 562 | | 560 | 560 | | 558 | 558 |
| 559 | | 563 | 564 | 563 | 562 | 562 | | 559 | 557 |
| 558 | 560 | 559 | 560 | 559 | 563 | 564 | 563 | | 560 |
| 559 | | 560 | | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | | 562 | 563 | 564 | 565 | 564 |
| 566 | 564 | 562 | | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4g

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4h

| 555 | 556 | 556 | 557 | 558 | 558 | 559 | 560 | 561 | ■ |
| --- | --- | --- | --- | --- | --- | --- | --- | --- | --- |
| 556 | 556 | 558 | 559 | 557 | 558 | 559 | 561 | ■ | 564 |
| 557 | 557 | 557 | 558 | 557 | 557 | 557 | 558 | 561 | ■ |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | ■ | 564 | ■ | 562 | 562 | 561 | 559 | 557 |
| 558 | 560 | 559 | 560 | 559 | ■ | 564 | ■ | 561 | 560 |
| 559 | 561 | 560 | 561 | 562 | 564 | 566 | 565 | 564 | 565 |
| ■ | 565 | 562 | 562 | 566 | 565 | 565 | 566 | 565 | 566 |
| 564 | ■ | 566 | 564 | 565 | 564 | ■ | 564 | 566 | 565 |
| 566 | 565 | 564 | ■ | 564 | ■ | 564 | 565 | 564 | 562 |
| 565 | 562 | 560 | 559 | 561 | 562 | ■ | 564 | 565 | 564 |
| 566 | 564 | 562 | 561 | ■ | 564 | 565 | 566 | 565 | 564 |
| 565 | 566 | 564 | ■ | 565 | 566 | 567 | 567 | 567 | 566 |
| 564 | 565 | 565 | 566 | 567 | 567 | 568 | 571 | 568 | 567 |

Figure 4i

| 555 | 556 | 556 | 557 | 558 | 558 | 559 | 560 | 561 | 563 |
|-----|-----|-----|-----|-----|-----|-----|-----|-----|-----|
| 556 | 556 | 558 | 559 | 557 | 558 | 559 | 561 | 563 |     |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 |     | 563 | 562 | 562 | 561 | 559 | 557 |
| 558 | 560 | 559 | 560 | 559 | 563 |     | 563 | 561 | 560 |
| 559 | 561 | 560 | 561 | 562 |     | 566 | 565 |     | 565 |
| 563 | 565 | 562 | 562 | 566 | 565 | 565 | 566 | 565 | 566 |
|     | 563 | 566 |     | 565 |     | 563 |     | 566 | 565 |
| 566 | 565 |     | 563 |     | 563 |     | 565 |     | 562 |
| 565 | 562 | 560 | 559 | 561 | 562 | 563 |     | 565 |     |
| 566 |     | 562 | 561 | 563 |     | 565 | 566 | 565 |     |
| 565 | 566 |     | 563 | 565 | 566 | 567 | 567 | 567 | 566 |
|     | 565 | 565 | 566 | 567 | 567 | 568 | 571 | 568 | 567 |

Figure 4j

| 555 | 556 | 556 | 557 | 558 | 558 | 559 | 560 | 561 | 563 |
|-----|-----|-----|-----|-----|-----|-----|-----|-----|-----|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 4k

| 555 | 556 | 556 | 557 | 558 | 558 | 559 | 560 | 561 | 563 |
|-----|-----|-----|-----|-----|-----|-----|-----|-----|-----|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 |     | 565 | 564 | 565 |
| 563 | 565 | 562 | 562 |     | 565 | 565 |     | 565 |     |
| 564 | 563 |     | 564 | 565 | 564 | 563 | 564 |     | 565 |
|     | 565 | 564 | 563 | 564 | 563 | 564 | 565 | 564 | 562 |
| 565 | 562 | 560 | 559 | 561 | 562 | 563 | 564 | 565 | 564 |
|     | 564 | 562 | 561 | 563 | 564 | 565 |     | 565 | 564 |
| 565 |     | 564 | 563 | 565 |     | 567 | 567 | 567 |     |
| 564 | 565 | 565 |     | 567 | 567 | 568 | 571 | 568 | 567 |

Figure 4l

| 555 | 556 | 556 | 557 | 558 | 558 | 559 | 560 | 561 | 563 |
|-----|-----|-----|-----|-----|-----|-----|-----|-----|-----|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 |     |     |     | 566 |
| 564 | 565 | 565 | 566 |     |     | 568 | 571 | 568 |     |

Figure 4m

|     |     | 556 | 557 | 558 | 558 | 559 | 560 | 561 | 563 |
|---|---|---|---|---|---|---|---|---|---|
|     |     | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 5a

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 5b

| 555 556 | ▓▓▓▓▓▓▓▓ | 559 560 | 561 563 |
| 556 556 | ▓▓▓▓▓▓▓▓ | 559 561 | 563 564 |
| ▓▓▓▓▓▓▓▓ | ▓▓▓▓▓▓▓▓ | ▓▓▓▓▓▓▓▓ | 561 563 |
| ▓▓▓▓▓▓▓▓ | ▓▓▓▓▓▓▓▓ | ▓▓▓▓▓▓▓▓ | 558 560 |
| 558 559 | 560 561 | 560 559 | 558 559 |
| 560 562 | 561 562 | 561 560 | 558 558 |
| 559 561 | 563 564 | 563 562 | 562 561 | ▓▓▓▓ |
| 558 560 | 559 560 | 559 563 | 564 563 | ▓▓▓▓ |

Figure 5c

| 555 | 556 | 556 | 557 | 558 | 558 | 559 | 560 | 561 | 563 |
|---|---|---|---|---|---|---|---|---|---|
| 556 | 556 | 558 | 558 | 557 | 558 | 559 | 561 | 563 | 564 |
| 557 | 557 | 557 | 558 | 557 | 557 | 557 | 558 | 561 | 562 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 5d

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 5e

| 555 | 556 | 556 | 557 | 558 | 558 | | | 561 | 563 |
|---|---|---|---|---|---|---|---|---|---|
| 556 | 556 | 558 | 559 | 557 | 558 | | | 563 | 564 |
| 557 | 557 | 557 | 558 | 557 | 557 | 557 | 558 | | |
| 557 | 558 | 558 | 559 | 558 | 557 | 556 | 557 | | |
| 558 | 559 | | | | | | | 558 | 559 |
| 560 | 562 | | | | | | | 558 | 558 |
| | | | | 563 | 562 | 562 | 561 | | |
| | | | | 559 | 563 | 564 | 563 | | |
| | | | | 562 | 564 | 566 | 565 | 564 | 565 |
| | | | | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | | | 561 | 562 | 563 | 564 | 565 | 564 |
| 566 | 564 | | | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 6f

| | | | | | | | | | |
|---|---|---|---|---|---|---|---|---|---|
| 555 | 556 | 556 | 557 | 558 | 558 | | | | |
| 556 | 556 | 558 | 559 | 557 | 558 | | | | |
| 557 | 557 | 557 | 558 | 557 | 557 | 557 | 558 | | |
| 557 | 558 | 558 | 559 | 558 | 557 | 556 | 557 | | |
| 558 | 559 | | | | | | | 558 | 559 |
| 560 | 562 | | | | | | | 558 | 558 |
| | | 563 | 564 | 563 | 562 | | | | |
| | | 559 | 560 | 559 | 563 | | | | |
| | | | | 562 | 564 | 566 | 565 | 564 | 565 |
| | | | | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | | | | | 563 | 564 | 565 | 564 |
| 566 | 564 | | | | | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 5g

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 565 | 563 | 564 | 563 | 561 | 560 |
| 559 | 561 | 560 | 561 | 562 | 564 | 566 | 565 | 564 | 565 |
| 563 | 565 | 562 | 562 | 565 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 562 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 5h

| 555 | 556 | 556 | 557 | 558 | 558 | 559 | 560 | | |
| 556 | 556 | 558 | 559 | 557 | 558 | 559 | 561 | | |
| 557 | 557 | 557 | 558 | 557 | 557 | 557 | 558 | | |
| 557 | 558 | 558 | 559 | 558 | 557 | 556 | 557 | | |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | | | | | | | 559 | 557 |
| 558 | 560 | | | | | | | 561 | 560 |
| | | 560 | 561 | 562 | 564 | 566 | 565 | 564 | 565 |
| | | 562 | 562 | 566 | 565 | 565 | 566 | 565 | 566 |
| | | | | | | | | 566 | 565 |
| | | | | | | | | 564 | 562 |
| 565 | 562 | 560 | 559 | | | | | 565 | 564 |
| 566 | 564 | 562 | 561 | | | | | 565 | 564 |
| 565 | 566 | | | 565 | 566 | 567 | 567 | 567 | 566 |
| 564 | 565 | | | 567 | 567 | 568 | 571 | 568 | 567 |

Figure 5i

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 563 | 564 | 566 | 565 | 564 | 565 |
| 563 | 565 | 562 | 562 | 561 | 565 | 565 | 566 | 565 | 565 |
| 564 | 563 | 566 | 564 | 561 | 564 | 563 | 564 | 566 | 565 |
| 565 | 565 | 564 | 565 | 564 | 563 | 564 | 565 | 564 | 562 |
| 565 | 562 | 560 | 559 | 561 | 562 | 563 | 564 | 565 | 564 |
| 565 | 564 | 562 | 561 | 563 | 564 | 565 | 565 | 565 | 564 |
| 565 | 566 | 564 | 563 | 565 | 566 | 567 | 567 | 567 | 566 |
| 564 | 565 | 566 | 566 | 567 | 567 | 568 | 571 | 568 | 567 |

Figure 5j

| 555 | 556 | 556 | 557 | 558 | 558 | 559 | 560 | 561 | 563 |
|---|---|---|---|---|---|---|---|---|---|
| 556 | 556 | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 5k

| 555 | | 556 | 557 | 558 | 558 | 559 | 560 | 561 | 563 |
|---|---|---|---|---|---|---|---|---|---|
| | | 558 | 559 | 557 | 558 | 559 | 561 | 563 | 564 |
| 557 | 557 | 557 | 558 | 557 | 557 | 557 | 558 | 561 | 563 |
| 557 | 558 | 558 | 559 | 558 | 557 | 556 | 557 | 558 | 560 |
| 558 | 559 | 560 | 561 | 560 | 559 | 558 | 557 | 558 | 559 |
| 560 | 562 | 561 | 562 | 561 | 560 | 560 | 561 | 558 | 558 |
| 559 | 561 | 563 | 564 | 563 | 562 | 562 | 561 | 559 | 557 |
| 558 | 560 | 559 | 560 | 559 | 563 | 564 | 563 | 561 | 560 |
| 559 | 561 | 560 | 561 | 562 | 564 | 566 | 565 | 564 | 565 |
| 563 | 565 | 562 | 562 | 566 | 565 | 565 | 566 | 565 | 566 |
| 564 | 563 | 566 | 564 | 565 | 564 | 563 | 564 | 566 | 565 |
| 566 | 565 | 564 | 563 | 564 | 563 | 564 | 565 | 564 | 562 |
| 565 | 562 | 560 | 559 | 561 | 562 | 563 | 564 | 565 | 564 |
| 566 | 564 | 562 | 561 | 563 | 564 | 565 | 566 | 565 | 564 |
| 565 | 566 | 564 | 563 | 565 | 566 | 567 | 567 | 567 | 566 |
| 564 | 565 | 565 | 566 | 567 | 567 | 568 | 571 | 568 | 567 |

Figure 8

COLORIZING A BLACK-AND-WHITE IMAGE TO FACILITATE THE IDENTIFICATION OF A PATTERN IN THE IMAGE

This application is a CIP of 09/383,025, Aug. 25, 1999, abandoned, which claims benefit of 60/097,817, filed Aug. 25, 1998.

BACKGROUND OF THE INVENTION

1. Field of the Invention

This invention relates to assisting in the analysis of an image and, in particular, to facilitating the identification of a pattern in an image. More particularly, the invention relates to the finding of an anomaly in a black-and-white image, such as an x-ray image (e.g., medical or dental x-ray images).

2. Related Art

The following are explanations of words, phrases, abbreviations and concepts used throughout this description:

1. Grayscale: A black-and-white image is displayed in shades of gray varying from no gray (white) to fully saturated gray (black). The various shades of gray in between (intensity of gray) are based on a mix of black and white. A value in this intensity range can be represented in bits.

2. Bits: A set of binary representations (each bit is a single binary representation). For example, a grayscale value can be represented by a series of bits. The number of bits establishes the number of gradations between black and white in the grayscale (i.e., the number of possible grayscale values). The number of possible grayscale values is equal to $2^n$, where n is the number of bits. For example, a 2 bit grayscale can represent 4 shades of gray (including black and white), while an 8 bit grayscale can represent 256 grades of gray (again, including black and white).

3. Pixel: A very small dot in an image (e.g., an image displayed on a computer screen or a photograph) or a virtual dot within a computers' memory representing a very small dot in an image that can be displayed on a computer screen. The density of pixels in an image represents the image's resolution. Many black-and-white photographic images have a resolution of over 5000 pixels to the inch. A black-and-white image can be scanned into a computer's memory at, for example, a resolution of about 1200 to 2400 pixels to the inch. Many computer display monitors can only display about 100 to 200 pixels to the inch; however, most computers' memory can still retain a scanned image resolution of 1200 to 2400 pixels to the inch. In a black-and-white image, each pixel can have any of a variety of shades of gray as represented by a series of bits.

4. DPI: Dots per inch, or pixels per inch.

5. Color roll: When a computer display monitor can only display 200 DPI and the image has 1200 DPI, the image includes six times the information that can be displayed at any one location. As described in more detail below, when the image information is represented in color (i.e., the image is colorized), display of all of the image information can be achieved by displaying over time a series of versions of the image in which the color displayed in each version of the image is alternated.

6. Anomaly: Most things in nature have smooth flowing lines and curves. A flaw in this smoothness can be referred to as an anomaly. A good example of an anomaly is a cut or scar on a person's forearm that interrupts the smooth surface of the forearm. As discussed in more detail below, the invention can advantageously be used to identify anomalies in an image (and, in particular, in an image of a part of the human anatomy).

7. Scanned image: Using a piece of equipment called a scanner, a black-and-white (or color) image on paper (or other similar medium) can be transformed from the "picture" to binary data that is usable by a computer. The computer representation of the picture is called a scanned image.

The expertise needed to locate a small (e.g., at the millimeter level) anomaly in an image takes a great deal of training and talent. In particular, discerning a small anomaly that is represented by less than 1% differential in grayscale can be extremely difficult. What has been needed is some computer assistance in performing that task, so that a person of lesser talent and/or experience can successfully screen an image, locate an anomaly, and pass on the findings to a specialist for further review.

Figure 1:
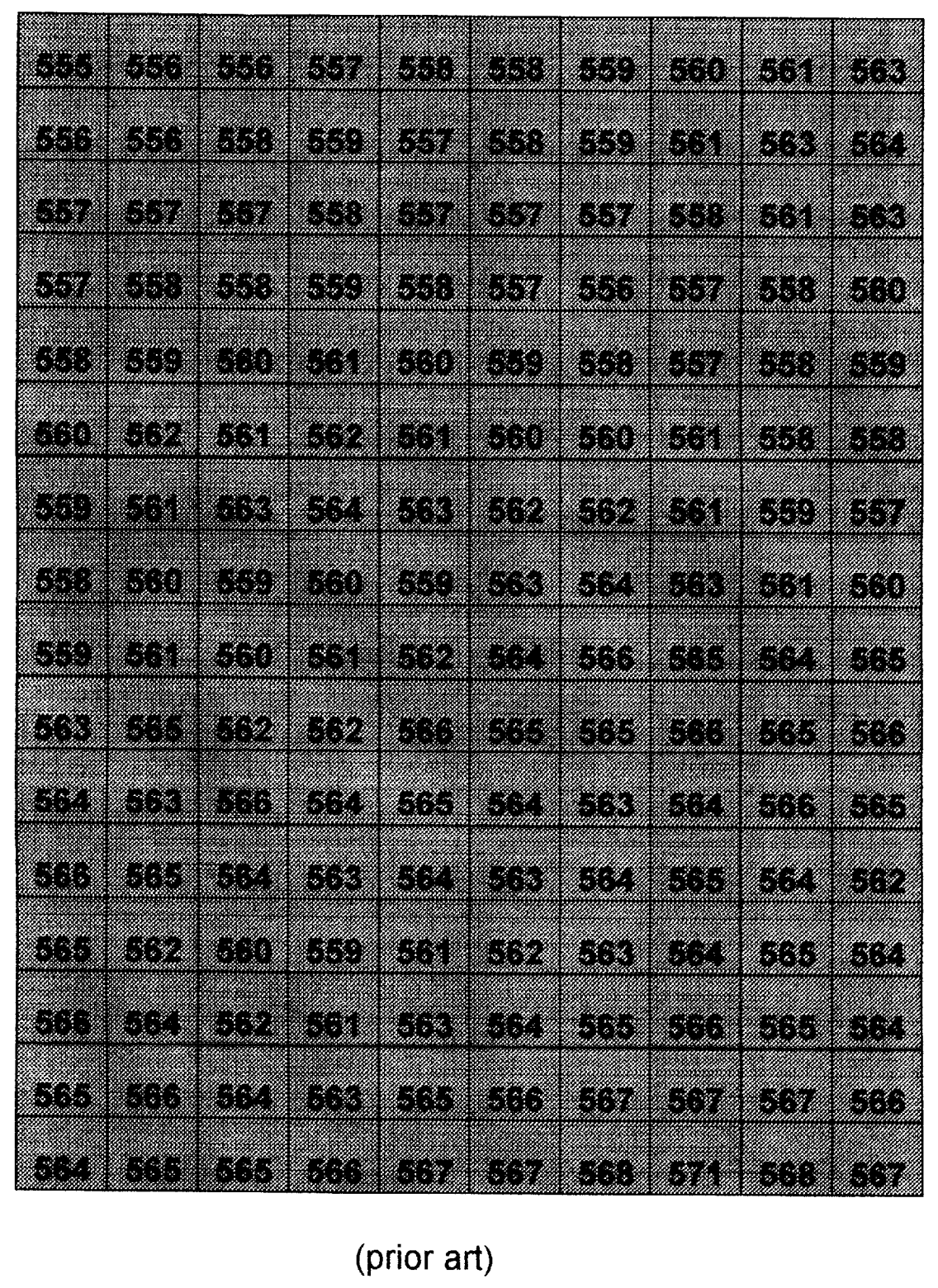

FIG. 1 illustrates the pixels of a part of a black-and-white image. Each pixel is represented by a square box (160 pixels are illustrated in FIG. 1) and is colored by a shade of gray corresponding to a grayscale value for that pixel. It is assumed that the grayscale values for the image can range between 1 and 1000, 1 corresponding to white and 1000 corresponding to black. In FIG. 1, the intensity of the shade of gray for each pixel corresponds to the numerical value in the box representing that pixel. As can be seen, the lightest shade of gray in FIG. 1 corresponds to the pixel having a grayscale value of 555 (in the upper left corner of FIG. 1) and the darkest shade of gray in FIG. 1 corresponds to the pixel having a grayscale value of 571 (near the lower right corner of FIG. 1). Thus, the grayscale intensity varies by a maximum of just 1.6% in the part of the black-and-white image illustrated in FIG. 1. The human eye can only see about a 2.0% variation in grayscale intensity at best (and typically more like about 3.0%) and that only when the regions differing in grayscale intensity are side by side. While, as can be seen from the numerical values representing the grayscale intensities of the pixels in FIG. 1, there is a definite variation in grayscale intensity within the part of the black-and-white image illustrated in FIG. 1, that variation cannot be discerned by the human eye. Moreover, size of the pixels in FIG. 1 is greatly exaggerated; pixels are typically much smaller, exacerbating the difficulty in perceiving variation in the grayscale intensity.

FIG. 2 illustrates the pixels of FIG. 1 with each pixel colored with a color corresponding to the grayscale value for that pixel, i.e., the image is "colorized." As illustrated in FIG. 2, three colors are used: red, green and blue. The three colors are repetitively assigned to grayscale values in order, i.e., as illustrated in FIG. 2, red is assigned to a grayscale value of 555, green is assigned to a grayscale value of 556, blue is assigned to a grayscale value of 557, red is assigned to a grayscale value of 558, green is assigned to a grayscale value of 559, blue is assigned to a grayscale value of 560, etc. In FIG. 2, all pixels are displayed at the same time with their corresponding color. While some patterning is discernible, this view of the image is still confusing since the same color is assigned to many different gray levels. A new approach to colorizing a black-and-white image to facilitate the identification of a pattern in the image is needed.

SUMMARY OF THE INVENTION

The invention facilitates the identification of a pattern in an image. In one embodiment of the invention, the identification of a pattern in an image can be facilitated by: 1) identifying a grayscale value for each of a multiplicity of pixels of the image (which can be all of the pixels of the image); 2) assigning one of a multiplicity of colors to each grayscale value; and 3) displaying a multiplicity of versions of the image in sequence at a specified rate, such that a) the display of each version of the image includes only pixels having a specified grayscale value or a grayscale value in a specified range of grayscale values that is smaller than the range of grayscale values for all pixels of the image, b) each pixel displayed in a version of the image is displayed in the color corresponding to the grayscale value of that pixel, and c) the specified grayscale value or range of grayscale values for which pixels are displayed in each successive displayed version of the image is incremented or decremented from the specified grayscale value or range of grayscale values for which pixels are displayed in the immediately previous displayed version of the image by a specified grayscale value increment or decrement. The specified grayscale value increment or decrement can be, for example, 1. The invention can further be implemented so that at least one of the multiplicity of colors is assigned to more than one grayscale value. For example, the multiplicity of colors can be repetitively assigned in a specified order beginning with the smallest or largest grayscale value and continuing successively in increasing or decreasing, respectively, order of grayscale value. When the display of each version of the image can include only pixels having a grayscale value in a specified range of grayscale values, the display of each version of the image can include only pixels having a grayscale value in a range of grayscale values that includes a number of grayscale values equal to the number of possible colors (e.g., three colors, such as red green and blue) that can be assigned to a grayscale value. When the image is represented in a first resolution that includes memory pixels and a second resolution that is used for display of the image and includes display pixels that each correspond to a multiplicity of memory pixels (e.g., each display pixel corresponds to a square array of four memory pixels), a display pixel of a version of the image can be determined to have a specified grayscale value or values displayed for that version of the image if at least a specified number (e.g., one or a specified percentage) of the corresponding memory pixels of the version of the image have the specified grayscale value or values. Further, each memory pixel corresponding to a display pixel having the specified grayscale value or values for a version of the image can be displayed in a shade of the color corresponding to the grayscale value of the display pixel based on the relationship of the grayscale value of the memory pixel to the grayscale value of the display pixel.

The invention facilitates recognition of patterns in an image and, in particular, an image that is black-and-white in whole or in part. The invention can be used generally to facilitate recognition in any type of image. The invention can be used, for example, to facilitate recognition of a pattern in an image of a part of the human anatomy (e.g., medical or dental x-ray images). In particular, the invention can be useful in analyzing a mammogram to identify, for example, spiculation.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

FIG. 1 illustrates the pixels of a part of a black-and-white image.

FIGS. 3a through 3o each illustrate a display of a version of the part of the image illustrated in FIG. 1, in accordance with an embodiment of the invention, where, in each version, only pixels having a grayscale value within a range of grayscale values specified for that version of the image are represented by the color corresponding to the grayscale value for that pixel.

FIGS. 4a through 4m each illustrate a display of a version of the part of the image illustrated in FIG. 1, in accordance with an embodiment of the invention, where, in each version, only pixels having a grayscale value specified for that version of the image are represented by the color corresponding to that grayscale value.

FIGS. 5a through 5k each illustrate a display of a version of the part of the image illustrated in FIG. 1, in accordance with an embodiment of the invention in which the resolution of the display of the image is less than the resolution of the stored version of the image.

FIG. 6 illustrates a display of a version of the part of the image illustrated in FIG. 1, in accordance with an embodiment of the invention in which color warping is used.

DETAILED DESCRIPTION OF THE INVENTION

Figure 2:
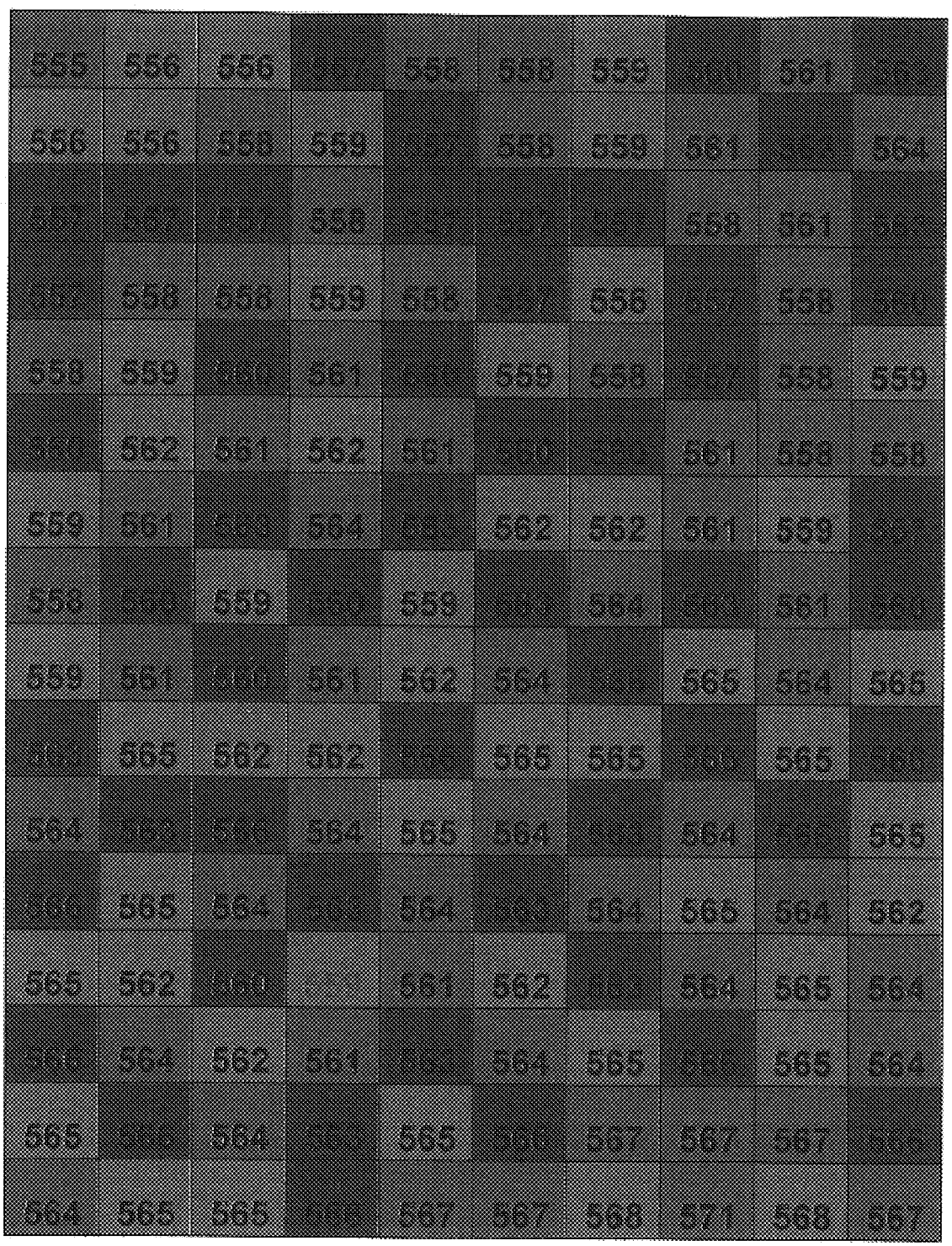
FIG. 2 illustrates the pixels of FIG. 1 with each pixel colored with a color corresponding to the grayscale value for that pixel.

The invention facilitates the identification of a pattern in an image. In particular, the invention colorizes a black-and-white image in a new way to emphasize patterns (e.g., one or more anomalies) present in the image. The invention includes dividing the pixels of an image into individual groups or packets of pixel(s) having similar grayscale values and thereafter coloring the individual packets or groups. More particularly, a grayscale value is identified for each of multiple pixels of an image (which can include all pixels of the image) and one of a multiplicity of colors is assigned to each grayscale value. Multiple versions of the image are then displayed in sequence at a specified rate. The display of each version of the image includes only pixels having a specified grayscale value or a grayscale value in a specified range of grayscale values that is smaller than the range of grayscale values for all pixels of the image. Each pixel displayed in a version of the image is displayed in the color corresponding to the grayscale value of that pixel. The specified grayscale value or range of grayscale values for which pixels are displayed in each successive displayed version of the image is incremented or decremented from the specified grayscale value or range of grayscale values for which pixels are displayed in the immediately previous displayed version of the image by a specified grayscale value increment or decrement. As will be appreciated from the description of the invention below and the illustration of the invention in the accompanying drawings, colorizing and displaying an image in accordance with the invention enables patterns to be discerned that would otherwise be very difficult or impossible to see. The invention can be implemented using a computer programmed to perform a method according to the invention, as described elsewhere herein.

For example, the invention can be used to identify a pattern in a black-and-white image scanned in at 12 bit resolution (this is for example only; some scanners can scan in images at a resolution of 30 bits or more). At that resolution, there are 4096 possible shades of gray in the image, i.e., 4096 possible grayscale values (for simplicity, it will be assumed that there are 4000 possible shades of gray in the image).

The pixels of a black-and-white image can be segregated by grouping together pixels having one of a set of (typically consecutive) grayscale values. In general, the number of grayscale values used to define each pixel group (packet) can be established as desired (e.g., one, two, three, four or more grayscale values). For instance, the pixels can be segregated into groups of four consecutive grayscale values, e.g., pixels having grayscale values of 1–4 are in a first group, pixels having grayscale values of 5–8 are in a second group, etc. With 4000 possible grayscale values, this yields 1000 groups (packets) of pixels. (FIGS. 3a through 3o, FIGS. 4a through 4m, FIGS. 5a through 5k and FIG. 6, discussed below, illustrate embodiments of the invention in which a single grayscale value defines each pixel group.) The invention can be implemented so that the number of grayscale values used to define each pixel group can be selected by a user of the invention. In particular, the packet size that best facilitates recognition of a pattern in an image by a particular user can depend on the particular perceptive capabilities of that user.

In accordance with the invention, a black-and-white image is colorized using multiple colors. In general, any number of colors can be used; however, the use of multiple colors (e.g., 2, 3 or 4 colors) can advantageously improve a user's ability to recognize a pattern in an image. Further, in general, any colors can be used (embodiments of the invention are described below in which red, green and blue are used to colorize an image). As with the number of grayscale values used to define each pixel group, the invention can be implemented so that the number and content of colors used can be selected by a user of the invention. Also as with the number of grayscale values used to define each pixel group, the number and content of colors that best facilitate recognition of a pattern in an image by a particular user can depend on the particular perceptive capabilities of that user. The colors used are assigned to groups of pixels. In particular, the invention can be implemented so that the colors used are repetitively assigned to successive groups of pixels. For instance, a black-and-white image can be colorized with four colors which are repetitively assigned to successive pixel groups. Table 1 shows four colors C1, C2, C3 and C4 repetitively assigned to the pixel groups S1, S2, S3 and S4 . . . S1000 identified as described above.

TABLE 1

| | |
|---|---|
| S1 | C1 |
| S2 | C2 |
| S3 | C3 |
| S4 | C4 |
| S5 | C1 |
| S6 | C2 |
| S7 | C3 |
| S8 | C4 |
| S9 | C1 |
| . | . |
| . | . |
| . | . |
| S1000 | C4 |

In accordance with the invention, a series of versions of the colorized image (or part of the image) are displayed, each version including only pixels having a specified grayscale value or range of grayscale values. When each version includes only pixels having a specified range of grayscale values, the grayscale values can define a single pixel group (e.g., pixel groups S1 through S100, described above) or the grayscale values can define multiple pixel groups which may each include a single grayscale value (see, e.g., FIGS. 3a through 3o, discussed below) or multiple grayscale values. In general, the number of pixel groups (packets) to be displayed in each version of the image can be established as desired (e.g., one, two, three, four, etc.). Again, as with the number of grayscale values used to define each pixel group and the number of colors used, the invention can be implemented so that the number of pixel groups to be displayed in each version of the image can be selected by a user of the invention. Further, it is again the case that the number of pixel groups to be displayed in each version of the image that best facilitates recognition of a pattern in an image by a particular user can depend on the particular perceptive capabilities of that user.

In general, the series of versions of the colorized image (or part of the image) can be displayed at any frame rate. The invention can be implemented so that the frame rate can be selected by a user of the invention. As with other parameters discussed above, it is the case that the frame rate that best facilitates recognition of a pattern in an image by a particular user can depend on the particular perceptive capabilities of that user. An advantage of displaying colorized versions of the image is that relatively high frame rates can be used.

Figure 3H:
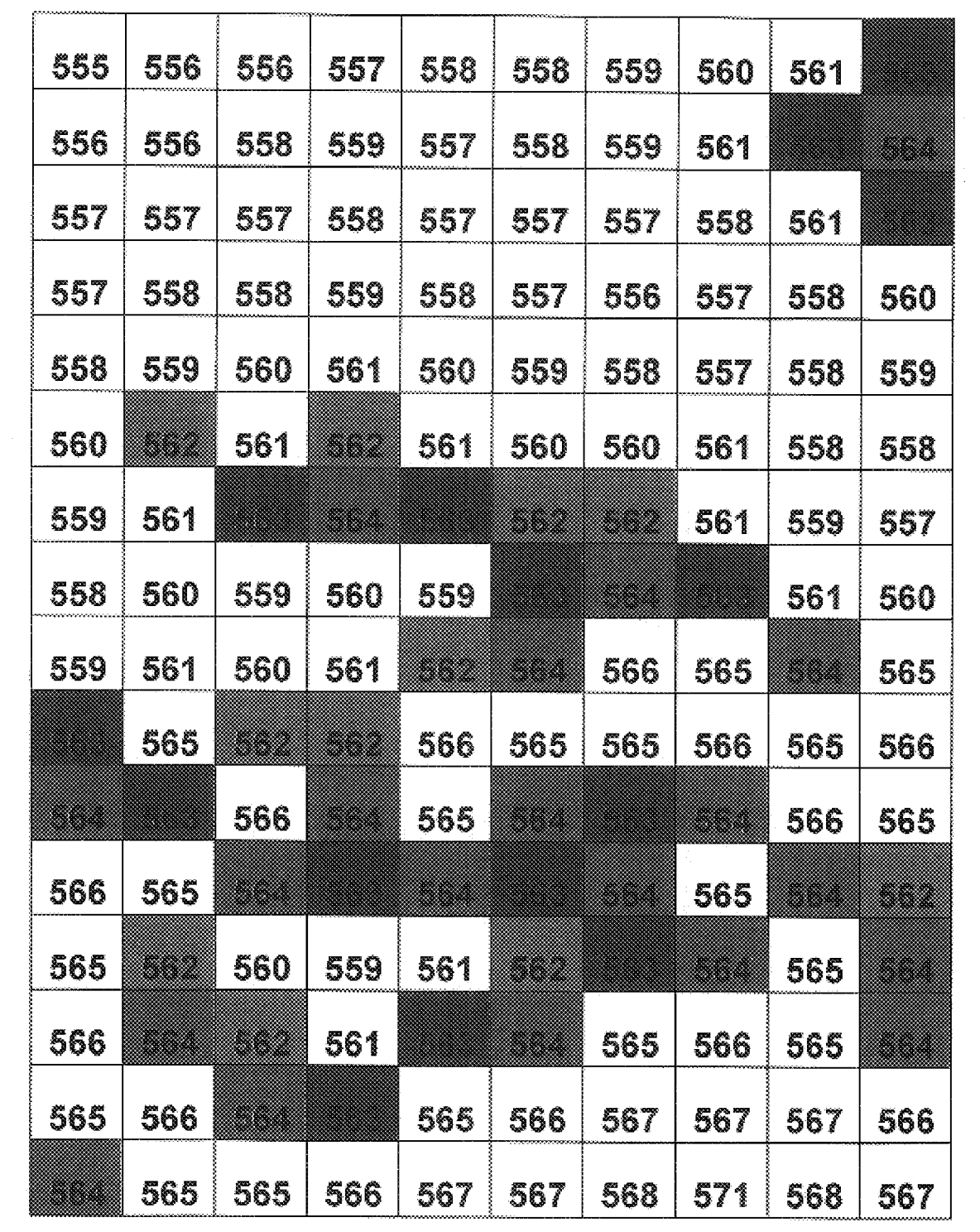

FIGS. 3a through 3o each illustrate a display of a version of the part of the image illustrated in FIG. 1, in accordance with an embodiment of the invention. In each version, only pixels having a grayscale value within a range of grayscale values specified for that version of the image are represented by the color corresponding to the grayscale value for that pixel. A single grayscale value defines each pixel group. Three colors are used to colorize the image: red, green and blue. The three colors are repetitively assigned to pixel groups (i.e., repetitively assigned to successive grayscale values) in that order, i.e., as illustrated in FIGS. 3a through 3o red is assigned to a grayscale value of 555, green is assigned to a grayscale value of 556, blue is assigned to a grayscale value of 557, etc. Three pixel groups are displayed in each version: pixels corresponding to successive groups of three grayscale values are displayed in each successive version, i.e., pixels having grayscale values from 555–557 are displayed in FIG. 3a, pixels having grayscale values from 556–558 are displayed in FIG. 3b, pixels having grayscale values from 557–559 are displayed in FIG. 3c, etc. As the versions of the colorized image of FIGS. 3a through 3o are successively displayed, patterns can be seen to appear and disappear at the locations of colorized pixels. For example, as the versions of the colorized image of FIGS. 3j through 3l are successively displayed, a near circular pattern can be discerned in the colorized pixels.

FIGS. 4a through 4m each illustrate a display of a version of the part of the image illustrated in FIG. 1, in accordance with an embodiment of the invention. In each version, only pixels having a grayscale value specified for that version of the image are represented by the color corresponding to that grayscale value. As in FIGS. 3a through 3o, a single grayscale value defines each pixel group and three colors (red, green and blue) are used to colorize the image by repetitively assigning the three colors to pixel groups (successive grayscale values) in order. However, in contrast to FIGS. 3a through 3o, only a single pixel group is displayed in each version: pixels corresponding to successive grayscale values are displayed in each successive version, i.e., pixels having a grayscale value of 555 are displayed in FIG. 4a, pixels having a grayscale value of 556 are displayed in FIG. 4b, pixels having a grayscale value of 557 are displayed in FIG. 4c, etc.

The resolution with which an image can be stored by an image data storage device can be greater than the resolution with which the image can be displayed by an image display device, i.e., the number of pixels (sometimes referred to herein as "memory pixels") in the stored representation of the image is greater than the number of pixels (sometimes referred to herein as "display pixels") in the display of the image. For example, if a six inch by six inch x-ray is scanned in to a computer's memory at 600 pixels per inch, the resulting image as stored in the computer memory would be 3,600 pixels by 3,600 pixels. However, a good computer monitor can only display about 1,000 pixels by 1,000 pixels. Thus, multiple pixels (memory pixels) of image data correspond to each pixel (display pixel) of the displayed image. The memory pixels corresponding to each display pixel can be (and typically are) of different shades of gray (different colors in the colorized image). In that case, for any particular display pixel there may be corresponding memory pixels having different grayscale values. When that occurs, the display device may display multiple colors at the same time corresponding to the different grayscale values, which can produce a random brown color that inhibits identification of a pattern in an image using the invention. To avoid this, the series of versions of the image can be displayed using a technique referred to herein as "color roll." Color roll alternates the colors produced in versions of an image displayed over time. For example, a display pixel of a version of a colorized image can be determined to have a specified grayscale value or values displayed for that version of the image if at least a specified number (e.g., one or a specified percentage) of the corresponding memory pixels of the version of the image have the specified grayscale value (s).

FIGS. 5a through 5k each illustrate a display of a version of the part of the image illustrated in FIG. 1, in accordance with an embodiment of the invention in which the resolution of the display of the image is less than the resolution of the stored version of the image. Each numerical value in FIGS. 5a through 5k represents a memory pixel. Each box in FIGS. 5a through 5k (which includes four numerical values) represents a display pixel, i.e., each display pixel corresponds to four memory pixels. In each version, only display pixels for which one (alternatively, the requirement could be two, three or four) of the corresponding memory pixels has a grayscale value specified for that version of the image are represented by the color corresponding to the specified grayscale value. The same display pixel can be represented by different colors in different versions of the image. For example, in FIG. 5a the upper left display pixel is displayed in red, since one of the memory pixels has a grayscale value of 555 (the corresponding color for which is red). In FIG. 5b, the same display pixel is displayed in green, since one (actually, three) of the memory pixels has a grayscale value of 556 (the corresponding color for which is green).

Because there is more information in each set or packet of data than can normally be displayed when the resolution of the display of the image is less than the resolution of the stored version of the image (in the example illustrated in FIGS. 3a through 3o, FIGS. 4a through 4m and FIGS. 5a through 5k, four times the displayed data), a user may wish to view (in close up) that additional information. This can be done by displaying all of the memory pixels corresponding to a display pixel and "warping" the color of the memory pixels in accordance with the differences in grayscale value among the memory pixels (e.g., if blue is the color to be displayed "normally" for a display pixel when using the invention, the memory pixels can be displayed with a light blue at the lighter grayscale and dark blue at the darker grayscale). This technique is referred to herein as "color warp." In general, the display of a colorized version of an image in which the resolution of the display of the image is less than the resolution of the stored version of the image can be color warped by displaying each memory pixel corresponding to a display pixel in a shade of the color corresponding to the grayscale value of the display pixel based on the relationship of the grayscale value of the memory pixel to the grayscale value of the display pixel. FIG. 6 illustrates a display of a version of the part of the image illustrated in FIG. 1, in accordance with an embodiment of the invention in which color warping is used. When, as described above, the resolution of the display of the image is less than the resolution of the stored version of the image, FIG. 6 illustrates the use color warping in producing a display of all of the memory pixels corresponding to a display pixel. Viewed in that way, FIG. 6 corresponds to the display of FIG. 5a: in the version of the image displayed in FIG. 6, only pixels having a grayscale value of 555 are represented (in red, the color corresponding to a grayscale value of 555). However, as can be seen, in the display of the version of the image illustrated in FIG. 6, the four pixels in the upper left corner of the display are each displayed in a shade of red (a lighter shade of red for the lower, i.e., lighter, grayscale value and a darker shade of red for the higher, i.e., darker, grayscale value); in contrast, in the display of the version of the image illustrated in FIG. 5a, only a single pixel in the upper left corner of the display is displayed as red.

Color warping can also be performed when the resolution of the display of the image is not less than (e.g., is equal to) the resolution of the stored version of the image. Color warping can be used when the packet size is greater than 1 (e.g., in one embodiment of the invention, greater than 3). Color warping in such cases is done in a manner analogous to that described above. Each pixel is displayed in a shade of the color corresponding to the packet based on the relationship of the grayscale value of the pixel to other pixels in the packet having a different grayscale value (e.g., as the grayscale value of the pixel decreases, the shade of the pixel becomes lighter and as the grayscale value of the pixel increases, the shade of the pixel becomes darker). FIG. 6 can also be viewed as an illustration of a display of a version of the part of the image illustrated in FIG. 1 when the packet size is 2 and color warping is used.

Figure 7:
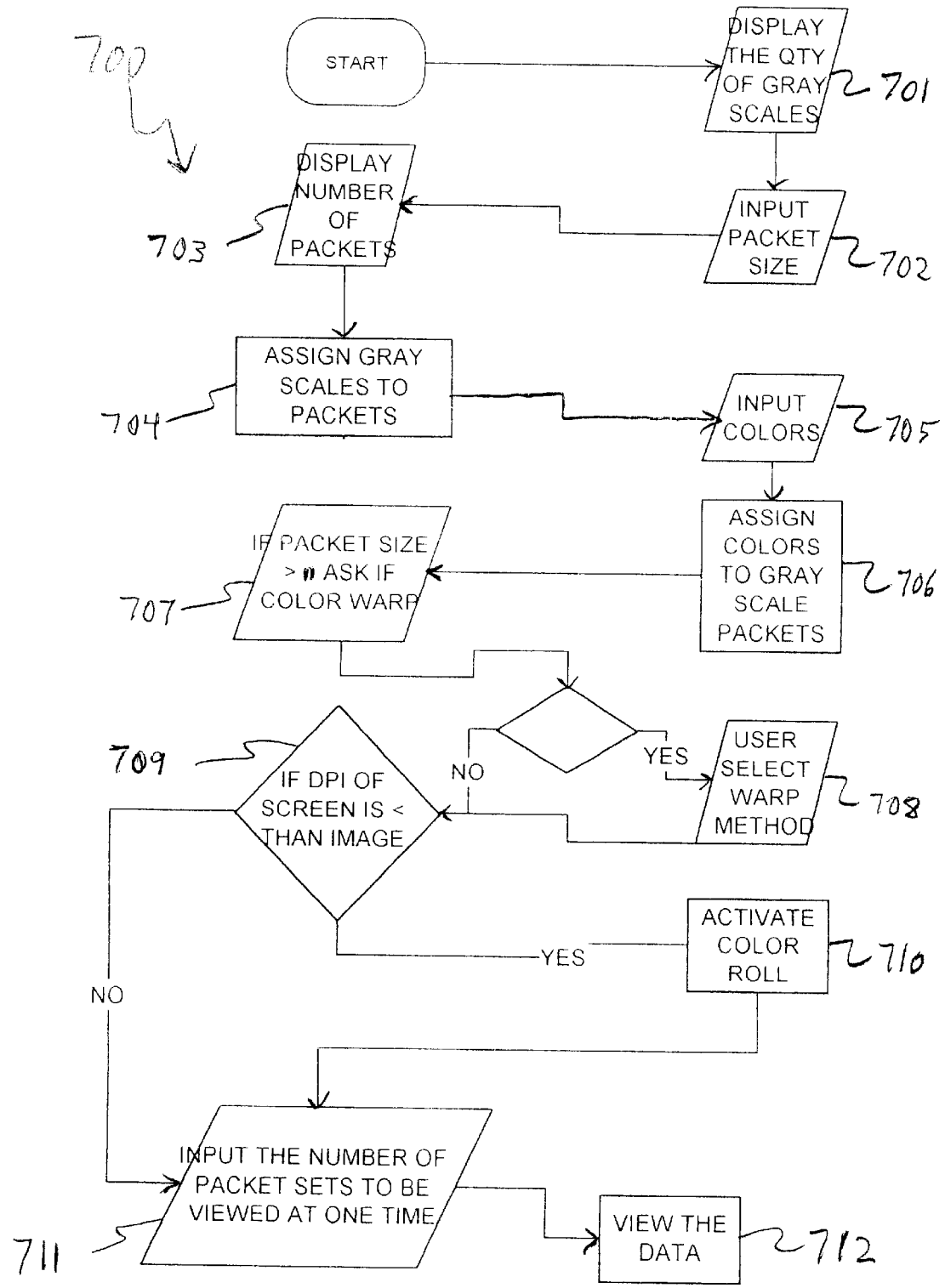
FIG. 7 is a flow chart of a method according to an embodiment of the invention.

FIG. 7 is a flow chart of a method 700 according to an embodiment of the invention. The method 700 (as well as any method according to the invention) can be implemented on a computer and can be embodied by one or more computer programs and/or data structures including instruction(s) and/or data for accomplishing the steps of the method. As will be apparent from the description below, the method 700 includes steps that enable a user to specify various parameters that produce a particular instantiation of the invention. However, it is to be understood that the method 700 could be modified to eliminate those steps, the parameters being previously specified for use in the method 700.

In step 701, the number of possible grayscale values is displayed. As discussed above, the number of possible grayscale values is determined by the number of bits used to represent a grayscale value.

In step 702, a user specifies the packet size, i.e., the number of grayscale values used to define each pixel group (packet). When more than one grayscale value is used to define a pixel group, the grayscale values that define a pixel group are typically consecutive.

In step 703, the number of packets is displayed. The number of packets is determined by dividing the number of possible grayscale values by the packet size. For example, if the number of possible grayscale values is 4096 and the packet size is 2, the number of packets is 2048.

In step 704, grayscale values are assigned to packets. This can be done by beginning with the smallest or largest possible grayscale value and successively assigning grayscale values to packets based on the packet size. For example, if the number of possible grayscale values is 4096 (i.e., 0 to 4095), the packet size is 2 and the number of packets is 2048, the first packet can have grayscale values 0 and 1 assigned thereto, the second packet can have grayscale values 3 and 4 assigned thereto, and so on until grayscale values 4094 and 4095 are assigned to the 2048th packet.

In step 705, a user specifies the colors to be used in colorizing the image. As discussed above, in general any number of colors and any colors can be used.

In step 706, colors are assigned to packets. In particular, as discussed above, the invention can be implemented so that the colors used are repetitively assigned to successive packets.

In step 707, a determination is made as to whether the packet size is greater than n (e.g., 2, 3, etc.) and, if so, a user is enabled to specify whether color warp is to be performed or not. As the packet size increases, color warping may be increasingly useful to further facilitate recognition of a pattern in an image.

If color warp is to be performed, then, in step 708, the user is enabled to specify a color warp method. In general, pixels on which color warp is performed are shaded in accordance with the relative magnitudes of the grayscale values of the pixels, as discussed above. The invention can be implemented so that a user can specify, for example, the degree of shading.

Whether or not color warp is to be performed, in step 709, a determination is made as to whether the resolution of the display of the image is less than the resolution of the stored version of the image. This can be done using knowledge of the resolution of the image data and of the display device being used.

If the resolution of the display of the image is less than the resolution of the stored version of the image, then, in step 710, color roll is performed. Color roll is described in more detail above (see, e.g., FIGS. 5*a* through 5*k* and the associated description).

Whether or not the resolution of the display of the image is less than the resolution of the stored version of the image, in step 711, a user specifies the number of packets to be viewed in each version of the colorized image.

This can indirectly specify the number of colors to be displayed in each version of the colorized image (see, e.g., FIGS. 3*a* through 3*o*, FIGS. 4*a* through 4*m* and FIGS. 5*a* through 5*k* and the associated description above).

Finally, in step 712, a series of versions of the colorized image are displayed. The display of each version of the colorized image is produced in accordance with the specified number of packets, the packet size, the assignment of colors to packets and the frame rate (though not shown as part of the method 700, the method 700 could be modified to enable a user to specify the frame rate; this could be done, for example, after step 711). Each successive version of the colorized image is produced by displaying pixels having a grayscale value or range of grayscale values that is incremented or decremented from the grayscale value or range of grayscale values for which pixels are displayed in the immediately previous displayed version of the image by a specified grayscale value increment or decrement. For example, each successive version of the colorized image can be produced using a set of grayscale value(s) determined by incrementing the lowest numbered grayscale value used to produce the immediately previous displayed version of the image by 1. Or, for example, each successive version of the colorized image can be produced using a set of packet(s) determined by incrementing the lowest numbered packet used to produce the immediately previous displayed version of the image by 1.

The invention facilitates recognition of patterns in an image. In particular, the invention facilitates recognition of patterns in an image that is black-and-white in whole or in part. The invention can be used generally to facilitate recognition in any type of image. The invention can be used, for example, to facilitate recognition of a pattern in an image of a part of the human anatomy (e.g., medical or dental x-ray images). For instance, the invention can be useful in analyzing a mammogram to identify, for example, spiculation.

Generally, the invention can be implemented in any apparatus (or as part of an apparatus), as any method (or part of a method), or as any computer program (or part of a computer program) that produces the functionality of the invention as described herein. In particular, as can be readily appreciated, the invention can be implemented in any computational device (which can be part of a larger apparatus or system) that is programmed (using software and/or firmware) to produce the functionality of the invention as described herein. The invention can be implemented, for example, by one or more computer programs and/or data structures including instruction(s) and/or data for accomplishing the functions of the invention. For example, such computer program(s) and/or data structure(s) can include instruction(s) and/or data for identifying a grayscale value a pixel of an image, assigning a color to each grayscale value (e.g., repetitively assigning colors in a specified order), and displaying a sequence of versions of the image in accordance with a particular instantiation of the invention. Those skilled in the art can readily implement the invention using one or more computer program(s) and/or data structure(s) in view of the description herein.

Figure 8:
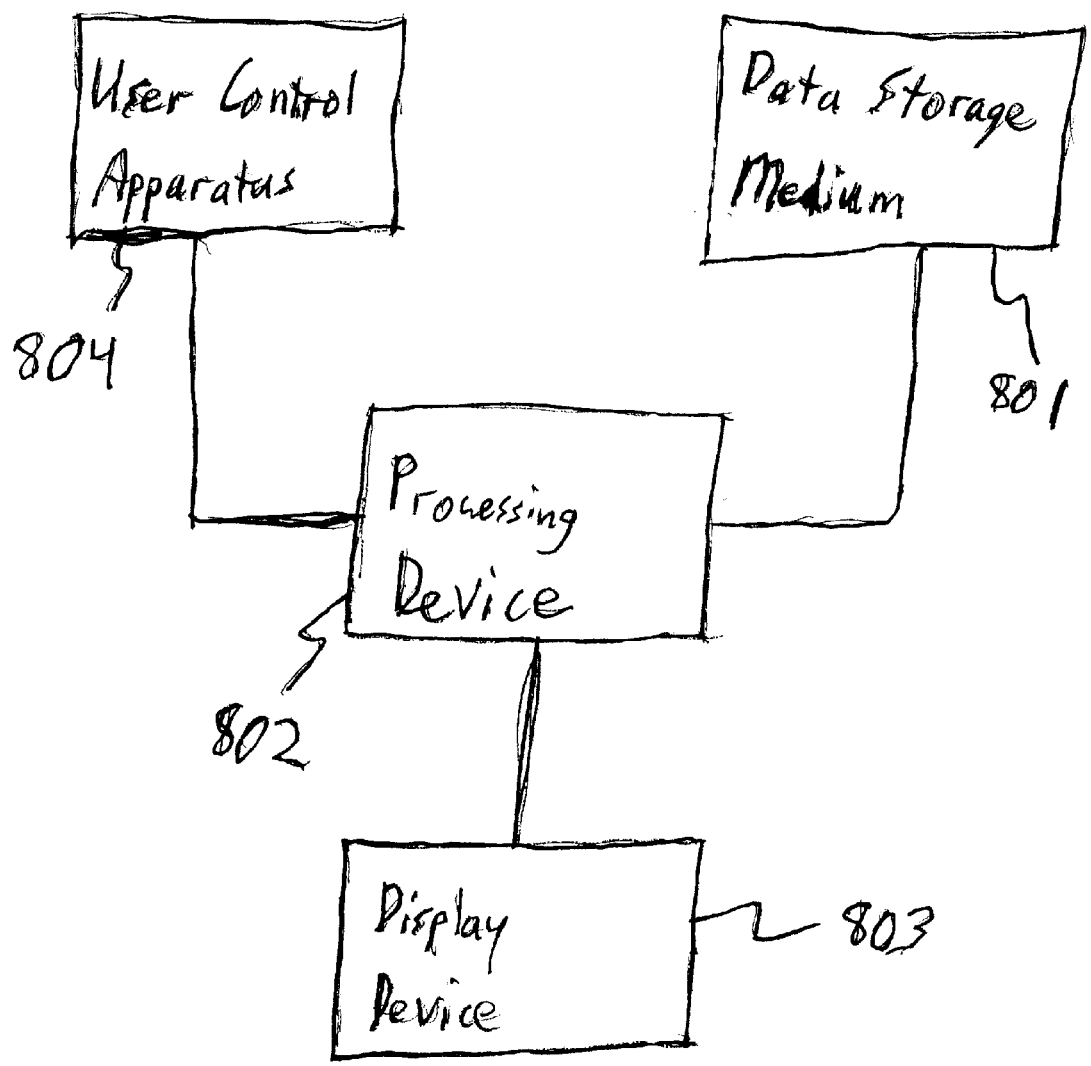
FIG. 8 is a block diagram illustrating components of a system in which the invention can be used.

FIG. 8 is a block diagram illustrating components of a system in which the invention can be implemented and used.

The components of the system illustrated in FIG. 8 can be embodied by any appropriate apparatus, as will be understood by those skilled in the art in view of the description herein. Image data (and associated metadata, as necessary or desirable) and/or one or more computer programs and/or data structures for accomplishing the functions of the invention can be stored on the data storage medium 801. The data storage medium 801 can be embodied by any appropriate apparatus, such as, for example, a hard drive (hard disk) and/or digital memory (which can be part of a computer, such as, for example, a desktop computer). A processing device 802 generally effects and enables operation of the system, including executing a method in accordance with the invention and generating a display of images on a display device 803. The processing device 802 can be embodied by any appropriate apparatus, such as, for example, a microprocessor (which, again, can be part of a computer, such as, for example, a desktop computer). The display device 803 is used to produce image displays and can be embodied by any appropriate apparatus, such as, for example, a television or a computer display monitor or screen. A user control apparatus 804 can be used by a user to control operation of the system. For example, the user control apparatus 804 can be used to enable a user to specify various parameters (e.g., packet size, number and content of colors used for colorization, number of packets to be displayed in each version of the image, frame rate at which the series of versions of the colorized image are displayed) that produce a particular instantiation of the invention. The user control apparatus 804 can be embodied by any appropriate apparatus, such as, for example, a keyboard and/or mouse.

Various embodiments of the invention have been described. The descriptions are intended to be illustrative, not limitative. Thus, it will be apparent to one skilled in the art that certain modifications may be made to the invention as described herein without departing from the scope of the claims set out below. For example, the color roll aspect of the invention can be used with arrangements other than arrangements for providing contrasting grayscale. Moreover, although the invention has been particularly described in connection with the analysis of black-and-white images, the invention can also be used to analyze color images having grayscale aspects (e.g., parts of the image that are represented in grayscale).

I claim:

1. A method for facilitating the identification of a pattern in an image, comprising the steps of:

identifying a grayscale value for each of a plurality of pixels of the image;

assigning one of a plurality of colors to each grayscale value; and displaying a plurality of versions of the image in sequence at a specified rate, wherein:

the display of each version of the image includes only pixels having a specified grayscale value or a grayscale value in a specified range of grayscale values that is smaller than the range of grayscale values for all pixels of the image;

each pixel displayed in a version of the image is displayed in the color corresponding to the grayscale value of that pixel; and the specified grayscale value or range of grayscale values for which pixels are displayed in each successive displayed version of the image is incremented or decremented from the specified grayscale value or range of grayscale values for which pixels are displayed in the immediately previous displayed version of the image by a specified grayscale value increment or decrement.

2. A method as in claim 1, wherein the display of each version of the image includes only pixels having a grayscale value in a specified range of grayscale values that is smaller than the range of grayscale values for all pixels of the image.

3. A method as in claim 2, wherein the display of each version of the image includes only pixels having a grayscale value in a range of grayscale values that includes a number of grayscale values equal to the number of possible colors that can be assigned to a grayscale value.

4. A method as in claim 3, wherein the number of grayscale values is three.

5. A method as in claim 1, wherein the display of each version of the image includes only pixels having a specified grayscale value.

6. A method as in claim 1, wherein:

the image is represented in a first resolution that includes memory pixels;

the image is represented in a second resolution that includes display pixels and that is used for display of the image, each display pixel corresponding to a plurality of memory pixels; and a display pixel of a version of the image is determined to have a specified grayscale value or values displayed for that version of the image if at least a specified number of the corresponding memory pixels of the version of the image have the specified grayscale value or values.

7. A method as in claim 6, wherein the specified number is 1.

8. A method as in claim 6, wherein the specified number represents a specified percentage of the memory pixels corresponding to a display pixel.

9. A method as in claim 6, wherein each of the display pixels corresponds to a square array of four memory pixels.

10. A method as in claim 6, wherein each memory pixel corresponding to a display pixel having the specified grayscale value or values for a version of the image is displayed in a shade of the color corresponding to the grayscale value of the display pixel based on the relationship of the grayscale value of the memory pixel to the grayscale value of the display pixel.

11. A method as in claim 1, wherein the specified grayscale value increment or decrement is 1.

12. A method as in claim 1, wherein the step of assigning one of a plurality of colors to each grayscale value further comprises the step of assigning at least one of the plurality of colors to more than one grayscale value.

13. A method as in claim 12, wherein the step of assigning one of a plurality of colors to each grayscale value further comprises the step of repetitively assigning the plurality of colors in a specified order beginning with the smallest or largest grayscale value and continuing successively in increasing or decreasing, respectively, order of grayscale value.

14. A method as in claim 1, wherein the step of identifying a grayscale value for each of a plurality of pixels of the image further comprises the step of identifying a grayscale value for each of the pixels of the image.

15. A system for facilitating the identification of a pattern in an image, comprising:

means for identifying a grayscale value for each of a plurality of pixels of the image;

means for assigning one of a plurality of colors to each grayscale value; and means for displaying a plurality of versions of the image in sequence at a specified rate, wherein:

the display of each version of the image includes only pixels having a specified grayscale value or a grayscale value in a specified range of grayscale values that is smaller than the range of grayscale values for all pixels of the image;

each pixel displayed in a version of the image is displayed in the color corresponding to the grayscale value of that pixel; and the specified grayscale value or range of grayscale values for which pixels are displayed in each successive displayed version of the image is incremented or decremented from the specified grayscale value or range of grayscale values for which pixels are displayed in the immediately previous displayed version of the image by a specified grayscale value increment or decrement.

16. A system as in claim 15, wherein the display of each version of the image includes only pixels having a grayscale value in a specified range of grayscale values that is smaller than the range of grayscale values for all pixels of the image.

17. A system as in claim 16, wherein the display of each version of the image includes only pixels having a grayscale value in a range of grayscale values that includes a number of grayscale values equal to the number of possible colors that can be assigned to a grayscale value.

18. A system as in claim 17, wherein the number of grayscale values is three.

19. A system as in claim 15, wherein the display of each version of the image includes only pixels having a specified grayscale value.

20. A system as in claim 19, wherein:

the image is represented in a first resolution that includes memory pixels;

the image is represented in a second resolution that includes display pixels and that is used for display of the image, each display pixel corresponding to a plurality of memory pixels; and a display pixel of a version of the image is determined to have the specified grayscale value displayed for that version of the image if at least a specified number of the corresponding memory pixels of the version of the image have the specified grayscale value.

21. A system as in claim 20, wherein the specified number is 1.

22. A system as in claim 20, wherein the specified number represents a specified percentage of the memory pixels corresponding to a display pixel.

23. A system as in claim 20, wherein each of the display pixels corresponds to a square array of four memory pixels.

24. A system as in claim 20, wherein each memory pixel corresponding to a display pixel having the specified grayscale value for a version of the image is displayed in a shade of the color corresponding to the specified grayscale value based on the relationship of the grayscale value of the memory pixel to the specified grayscale value.

25. A system as in claim 15, wherein the specified grayscale value increment or decrement is 1.

26. A system as in claim 15, wherein the means for assigning one of a plurality of colors to each grayscale value further comprises means for assigning at least one of the plurality of colors to more than one grayscale value.

27. A system as in claim 26, wherein the means for assigning one of a plurality of colors to each grayscale value further comprises means for repetitively assigning the plurality of colors in a specified order beginning with the smallest or largest grayscale value and continuing successively in increasing or decreasing, respectively, order of grayscale value.

28. A system as in claim 15, wherein the means for identifying a grayscale value for each of a plurality of pixels of the image further comprises means for identifying a grayscale value for each of the pixels of the image.

29. A computer readable medium or media encoded with one or more computer programs and/or data structures for facilitating the identification of a pattern in an image, comprising:

instructions and/or data for identifying a grayscale value for each of a plurality of pixels of the image;

instructions and/or data for assigning one of a plurality of colors to each grayscale value; and instructions and/or data for displaying a plurality of versions of the image in sequence at a specified rate, wherein:

the display of each version of the image includes only pixels having a specified grayscale value or a grayscale value in a specified range of grayscale values that is smaller than the range of grayscale values for all pixels of the image;

each pixel displayed in a version of the image is displayed in the color corresponding to the grayscale value of that pixel; and the specified grayscale value or range of grayscale values for which pixels are displayed in each successive displayed version of the image is incremented or decremented from the specified grayscale value or range of grayscale values for which pixels are displayed in the immediately previous displayed version of the image by a specified grayscale value increment or decrement.

30. A computer readable medium or media as in claim 29, wherein the display of each version of the image includes only pixels having a grayscale value in a specified range of grayscale values that is smaller than the range of grayscale values for all pixels of the image.

31. A computer readable medium or media as in claim 30, wherein the display of each version of the image includes only pixels having a grayscale value in a range of grayscale values that includes a number of grayscale values equal to the number of possible colors that can be assigned to a grayscale value.

32. A computer readable medium or media as in claim 31, wherein the number of grayscale values is three.

33. A computer readable medium or media as in claim 29, wherein the display of each version of the image includes only pixels having a specified grayscale value.

34. A computer readable medium or media as in claim 33, wherein:

the image is represented in a first resolution that includes memory pixels;

the image is represented in a second resolution that includes display pixels and that is used for display of the image, each display pixel corresponding to a plurality of memory pixels; and a display pixel of a version of the image is determined to have the specified grayscale value displayed for that version of the image if at least a specified number of the corresponding memory pixels of the version of the image have the specified grayscale value.

35. A computer readable medium or media as in claim 34, wherein the specified number is 1.

36. A computer readable medium or media as in claim 34, wherein the specified number represents a specified percentage of the memory pixels corresponding to a display pixel.

37. A computer readable medium or media as in claim 34, wherein each of the display pixels corresponds to a square array of four memory pixels.

38. A computer readable medium or media as in claim 34, wherein each memory pixel corresponding to a display pixel having the specified grayscale value for a version of the image is displayed in a shade of the color corresponding to the specified grayscale value based on the relationship of the grayscale value of the memory pixel to the specified grayscale value.

39. A computer readable medium or media as in claim 29, wherein the specified grayscale value increment or decrement is 1.

40. A computer readable medium or media as in claim 29, wherein the instructions and/or data for assigning one of a plurality of colors to each grayscale value further comprise instructions and/or data for assigning at least one of the plurality of colors to more than one grayscale value.

41. A computer readable medium or media as in claim 40, wherein the instructions and/or data for assigning one of a plurality of colors to each grayscale value further comprise instructions and/or data for repetitively assigning the plurality of colors in a specified order beginning with the smallest or largest grayscale value and continuing successively in increasing or decreasing, respectively, order of grayscale value.

42. A computer readable medium or media as in claim 29, wherein the instructions and/or data for identifying a grayscale value for each of a plurality of pixels of the image further comprise instructions and/or data for identifying a grayscale value for each of the pixels of the image.

* * * * *